US012604369B2

(12) United States Patent
Nam et al.

(10) Patent No.: US 12,604,369 B2
(45) Date of Patent: Apr. 14, 2026

(54) HEAT SOURCE DEVICE, SUBSTRATE SUPPORT DEVICE AND SUBSTRATE PROCESSING FACILITY

(71) Applicant: NPS Corporation, Hwaseong-Si (KR)

(72) Inventors: Won Sik Nam, Hwaseong-si (KR); Kang Heum Yeon, Osan-si (KR); Dae Seok Song, Osan-si (KR)

(73) Assignee: NPS CORPORATION (KR)

( * ) Notice: Subject to any disclaimer, the term of this patent is extended or adjusted under 35 U.S.C. 154(b) by 1037 days.

(21) Appl. No.: 17/720,235

(22) Filed: Apr. 13, 2022

(65) Prior Publication Data

US 2022/0338304 A1 Oct. 20, 2022

(30) Foreign Application Priority Data

Apr. 20, 2021 (KR) ........................ 10-2021-0051162

(51) Int. Cl.
*H05B 3/00* (2006.01)

(52) U.S. Cl.
CPC .................................. *H05B 3/0033* (2013.01)

(58) Field of Classification Search
None
See application file for complete search history.

(56) References Cited

U.S. PATENT DOCUMENTS 5,781,693 A * 7/1998 Ballance ................. C30B 25/14
118/724
5,937,142 A * 8/1999 Moslehi ............ H01L 21/67248
392/416
6,090,210 A * 7/2000 Ballance ........... H01L 21/67115
239/596
6,167,195 A * 12/2000 Moslehi ................ C23C 16/481
219/390
6,376,804 B1 * 4/2002 Ranish .............. H01L 21/67115
118/724
6,476,362 B1 * 11/2002 Deacon ................ H05B 3/0047
118/724
6,559,424 B2 * 5/2003 O'Carroll ......... H01L 21/67115
118/724
8,513,626 B2 * 8/2013 Ramachandran ............................
H01L 21/67115
359/359
11,043,403 B2 * 6/2021 Kim .................. H01L 21/68728
2009/0274454 A1 * 11/2009 Aderhold ................ H01L 22/26
219/442

(Continued)

FOREIGN PATENT DOCUMENTS

CN 104733350 A 6/2015
CN 106024670 A * 10/2016 ........ H01L 21/67115

(Continued)

*Primary Examiner* — Thor S Campbell
(74) *Attorney, Agent, or Firm* — Renaissance IP Law Group LLP

(57) ABSTRACT

The present inventive concept relates to a heat source device, a substrate support device, and a substrate processing facility comprising the same. According to the present inventive concept, a substrate can be uniformly heated and stably supported by a chamber having an inner space where the substrate is treated, and a substrate support device installed in the chamber to stably support the substrate and a heat source device installed in the chamber to uniformly heat the substrate.

15 Claims, 10 Drawing Sheets

(56) References Cited

U.S. PATENT DOCUMENTS

| | | | | |
|---|---|---|---|---|
| 2012/0207456 | A1* | 8/2012 | Kim | H05B 3/744 392/411 |
| 2013/0308928 | A1* | 11/2013 | Kim | H01L 21/67115 392/411 |
| 2014/0003800 | A1* | 1/2014 | Ramamurthy | H01L 21/67115 392/416 |
| 2015/0147053 | A1* | 5/2015 | Ranish | H05B 3/0047 392/411 |
| 2015/0206786 | A1* | 7/2015 | Serebryanov | H01L 21/324 438/795 |
| 2016/0284572 | A1* | 9/2016 | Jeong | H01L 21/67115 |
| 2023/0140032 | A1* | 5/2023 | He | H05B 31/02 392/411 |

FOREIGN PATENT DOCUMENTS

| | | | | |
|---|---|---|---|---|
| JP | 2006505123 | A | 2/2006 | |
| JP | 2015119181 | A | 6/2015 | |
| JP | 2016189454 | A | 11/2016 | |
| KR | 20020086378 | A | 11/2002 | |
| KR | 20050050660 | A | 5/2005 | |
| KR | 100807120 | B1 * | 2/2008 | H01L 21/324 |
| KR | 100902633 | B1 | 6/2009 | |
| KR | 100940544 | B1 | 2/2010 | |
| KR | 20130128859 | A | 11/2013 | |
| KR | 101458963 | B1 | 11/2014 | |
| KR | 20170013307 | A | 2/2017 | |
| KR | 101992379 | B1 | 6/2019 | |
| KR | 20200053347 | A | 5/2020 | |
| TW | 201907142 | A | 2/2019 | |
| WO | WO-2005029561 | A1 * | 3/2005 | H01L 21/67109 |

* cited by examiner

140 : 142, 143, 144, 145, 146

(a)

(b)

(a)

(b)

HEAT SOURCE DEVICE, SUBSTRATE SUPPORT DEVICE AND SUBSTRATE PROCESSING FACILITY

CROSS-REFERENCE TO RELATED APPLICATION

This application claims priority to Korean Patent Application No. 10-2021-0051162 filed on Apr. 20, 2021, and all the benefits accruing therefrom under 35 U.S.C. § 119, the contents of which are incorporated by reference in their entirety.

TECHNICAL FIELD

The present disclosure relates to a heat source device, a substrate support device and a substrate processing facility, and more particularly, to a heat source device, a substrate support device and a substrate processing facility which can uniformly heat a substrate and stably support a substrate.

BACKGROUND

Rapid thermal processing (RTP) is a method for heating a substrate by irradiating the substrate with radiation emitted from a heat source such as a tungsten lamp. This rapid thermal processing method can rapidly heat or cool a substrate compared to a conventional substrate heat treatment method using a furnace, and it is easy to control a pressure condition or a temperature range, so that the heat treatment quality of the substrate can be improved.

However, as a size of substrate increases, it is difficult to uniformly heat the entire substrate using a heat source. Therefore, to uniformly heat the entire substrate, various efforts are being made, such as shortening a distance between the heat source and the substrate or changing the arrangement of heat sources.

Meanwhile, in the rapid thermal processing, a method of rotating a substrate to uniformly heat the substrate is applied. Therefore, a substrate support device which can rotatably support a substrate is installed in a substrate processing space. The substrate support device comprises a ring-shaped substrate support member which may minimize an area in contact with a substrate and support the substrate horizontally such that a temperature deviation across the substrate is suppressed during substrate processing and a ring-shaped rotating member which may be rotatably installed on a bottom of the substrate support member.

At this time, since the rotating member has an outer diameter greater than that of the substrate support part, it is directly exposed to radiation emitted from a heat source during substrate processing. Although the substrate support member is also exposed to radiation during substrate processing, it is not easily deformed even when overheated because it is formed from the same material as the substrate. Also, since the substrate support member has a relatively small size, even when it is deformed, the amount of deformation is small, so that the substrate can be stably supported. However, since the rotating member is formed from a material different from the substrate support member and has a larger size than that of the substrate support member, when it is overheated and deformed by radiation, the amount of deformation is greater than that of the substrate support member, so that the substrate cannot be stably supported.

SUMMARY

The present inventive concept provides a heat source device, a substrate support device, and a substrate processing facility which can uniformly heat a substrate.

Further, the present inventive concept provides a heat source device, a substrate support device, and a substrate processing facility which can stably support a substrate.

In accordance with an embodiment of the present inventive concept, a heat source device for treating a substrate may comprise a plurality of heat sources; and a support part provided with insertion holes formed to extend in one direction for inserting said heat sources, and grooves formed in one side of the insertion holes to collect and reflect radiations emitted from said heat sources, wherein the grooves may comprise a plurality of first grooves formed in the support part to form a first group extending in a first direction that intersects with the extending direction of the insertion holes, and a plurality of second grooves formed in the support part to form a second group extending in a second direction that intersects with the extending direction of the insertion holes and is orthogonal to the first direction.

The first group and the second group may be alternately disposed in the first direction and the second direction, the first group may be disposed to be spaced apart to form lines in the first direction, and the second group may be disposed in at least one side of the first group to form lines in the second direction.

The first group may be disposed to be surrounded by the second group, and the second group may be disposed to be surrounded by the first group.

The first and second grooves may be formed to have the same diameter, a length of the first group in the first direction may be identical with a length of the second group in the second direction, and a length of the first group in the second direction may be identical with a length of the second group in the first direction.

The first group may comprise a plurality of first grooves arranged in 3 columns and 2 rows, and the second group may comprise a plurality of second grooves arranged in 2 columns and 3 rows.

A distance between the centers of the first grooves adjacent to each other, a distance between the centers of the second grooves adjacent to each other, and a distance between the centers of the first groove and the second groove adjacent to each other may be the same.

The first group may be disposed in the center of the support part, and the center of the first groove disposed in one of 1st column 1st row, 1st column 2nd row, 3rd column 1st row and 3rd column 2nd row in the first group may be disposed in the center of the support part.

In accordance with another embodiment of the present inventive concept, a substrate processing device may comprise a rotating member formed in a ring shape; a connecting member formed in a ring shape and installed in an upper portion of the rotating member; and a substrate support member formed in a ring shape and installed in an upper portion of the connecting member so as to extend outwardly of the connecting member, which is partially in contact with a lower surface of a substrate.

The substrate support member may be formed to be entirely disposed at a position below the lower surface of the substrate.

The substrate support member may comprise a main body extending in a direction that intersects with the extending direction of the substrate; a support unit being able to contact with a substrate and connected to an upper portion of the main body to extend in a direction that intersects with the extending direction of the main body; and a seating unit being able to contact with the connecting member and connected to a lower portion of the main body to extend in a direction that intersects with the extending direction of the main body, wherein the main body and the seating unit may be formed in a ring shape, and wherein an outer diameter of the main body may be greater than an outer diameter of the connecting member, and an outer diameter of the seating unit may be smaller than the outer diameter of the main body.

An upper surface of the main body may be formed to be planar.

The upper surface of the main body may be formed to be inclined downwardly to the outside.

An angle between the support unit and the main body may be greater than or equal to 90° and less than 180°.

The substrate support member may comprise a heat insulation layer which is formed on at least the lower surface of the main body.

In accordance with another embodiment of the present inventive concept, a substrate processing facility may comprise a chamber having an inner space where a substrate is treated; and a heat source device installed in the chamber to heat the substrate and provided with at least one of the foregoing features.

In accordance with another embodiment of the present inventive concept, a substrate processing facility may comprise a chamber having an inner space where a substrate is treated; and a substrate support device installed in the chamber to support the substrate and provided with at least one of the foregoing features.

A protective member may be further installed in the chamber to surround at least a portion of the substrate support device, wherein the protective member may be disposed to be spaced apart from the connecting member in a horizontal direction and to overlap a portion of the substrate support member in a vertical direction.

The substrate support member may be entirely disposed at a position lower than the substrate and may be formed to cover at least the connecting member.

Effects of the Inventive Concept

A heat source device according to an embodiment of the present inventive concept may comprise a support part having grooves with a predetermined pattern to allow a radiation to be uniformly emitted across the heat source device. Also, the grooves may be disposed almost continuously along a radial direction of the heat source device or substrate. Therefore, it is possible to suppress a temperature deviation across the substrate and uniformly heat the substrate during the substrate processing.

Furthermore, the grooves may be formed in a support part as a predetermined pattern, so that the heat source devices having various sizes may be easily produced. In particular, it is possible to produce a heat source device which can treat a large-area substrate.

Additionally, it is possible to suppress or prevent the overheating of various structures installed in a substrate processing space by a radiation emitted from heat sources. That is, by altering a configuration of the substrate support device, it is possible to prevent the structures supporting a substrate from being directly exposed to the radiation. Therefore, the overheating and deformation of the substrate support device by the radiation may be suppressed, so that the position of the substrate may be stably maintained during the substrate processing.

DETAILED DESCRIPTION

Figure 1:
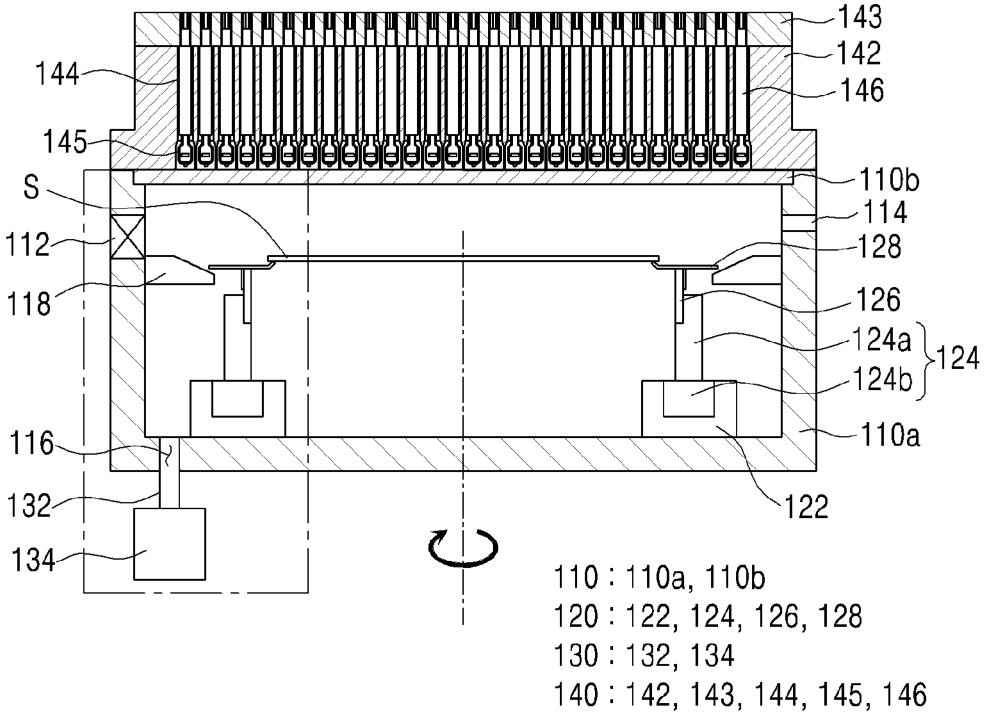
FIG. 1 is a cross-sectional view of a substrate processing facility in accordance with an embodiment of the present inventive concept.

Hereinafter, with reference to the accompanying drawings, the embodiments of the present inventive concept will be described in detail. However, the present inventive concept is not limited to these embodiments disclosed below and will be implemented in various forms. Only the embodiments of the present inventive concept are provided to complete the disclosure of the present inventive concept, and to completely inform those of ordinary skill in the art the scope of the invention. The same reference numerals in the drawings refer to the same elements.

Figure 2:
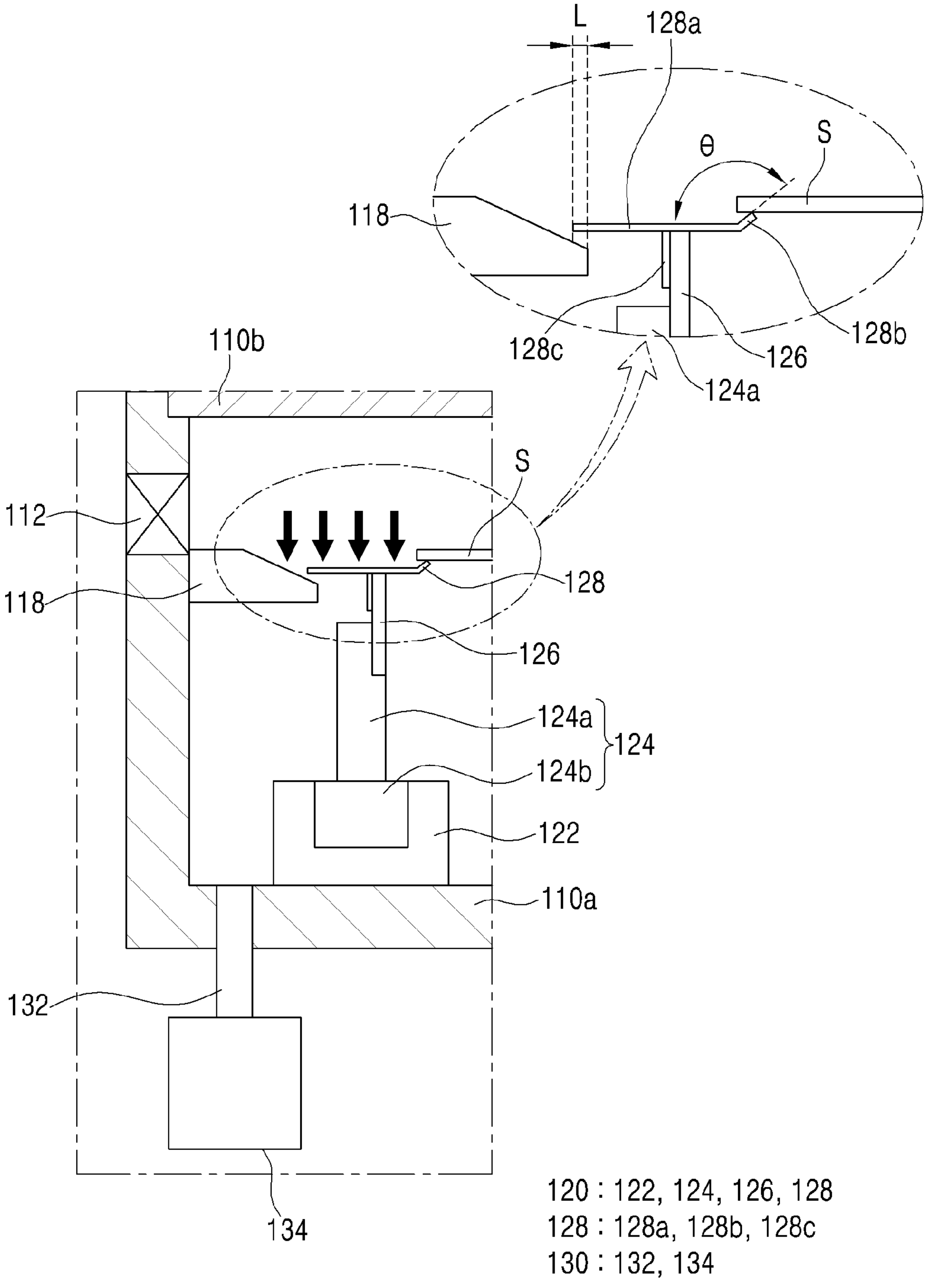
FIG. 2 is a cross-sectional view showing in detail a part of a substrate support device in accordance with to an embodiment of the present inventive concept.
Figure 3:
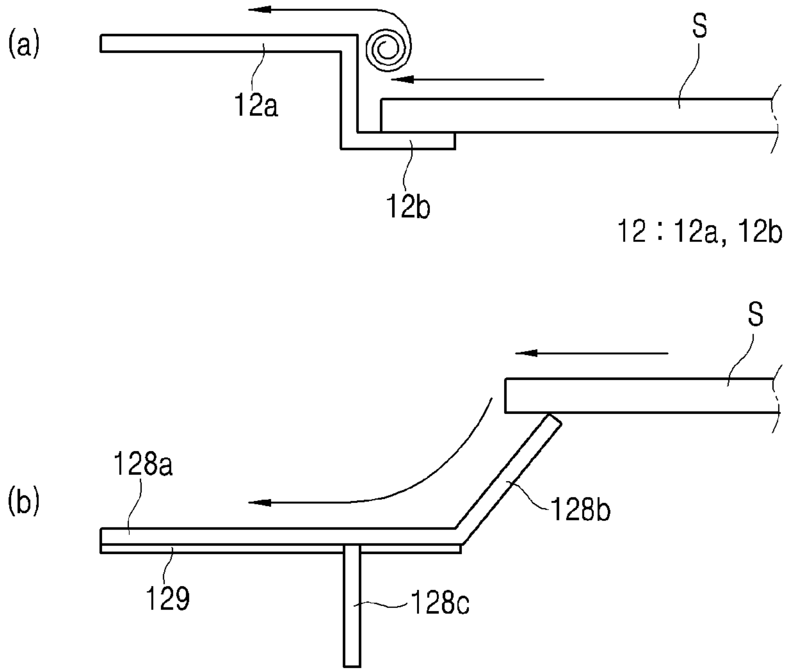
FIG. 3 is a view illustrating a flow of a process gas on an upper portion of a substrate support member during substrate processing.
Figure 4:
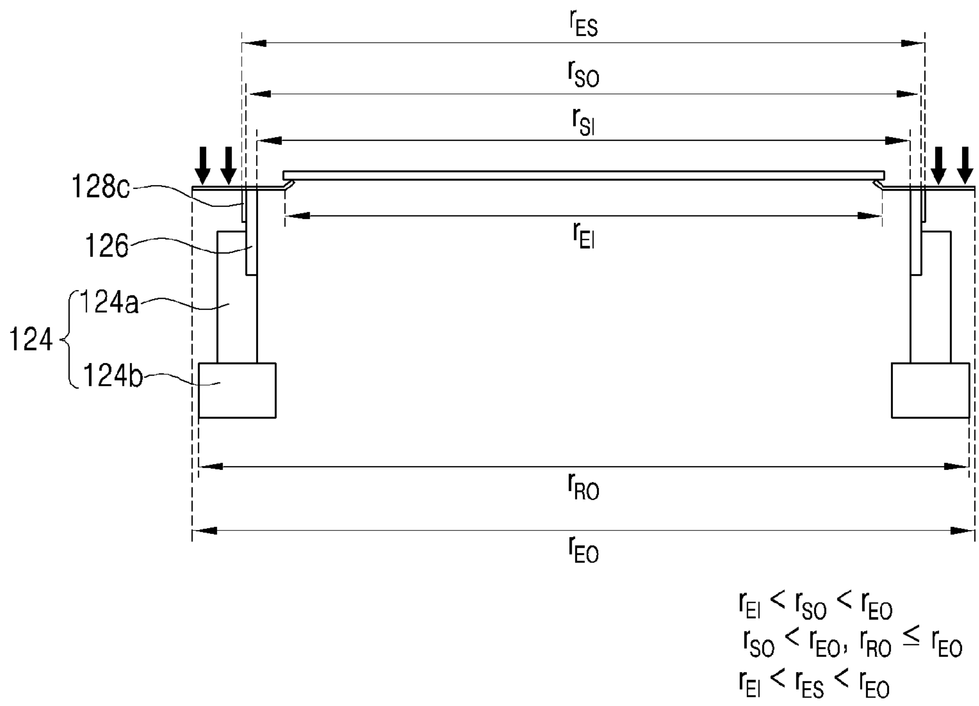
FIG. 4 is a schematic diagram showing a substrate support device in accordance with an embodiment of the present inventive concept.
Figure 5:
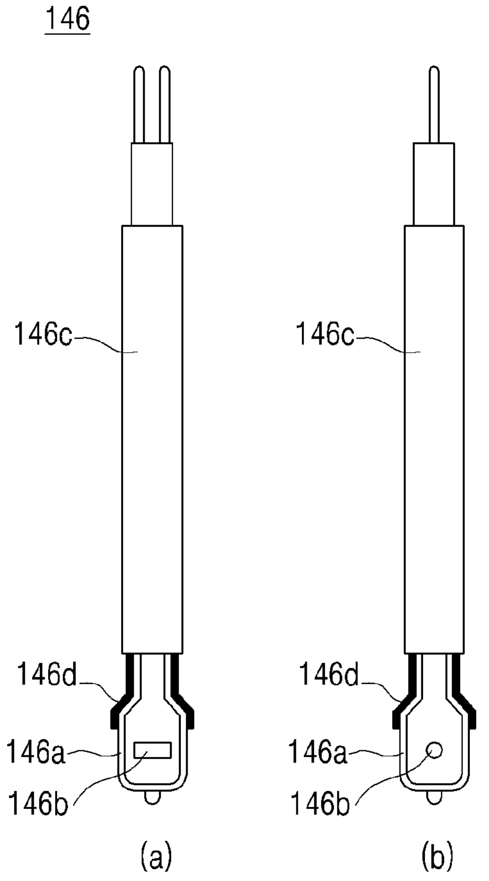
FIG. 5 is a view showing a heat source applied to a heat source device in accordance with an embodiment of the present inventive concept.
Figure 6:
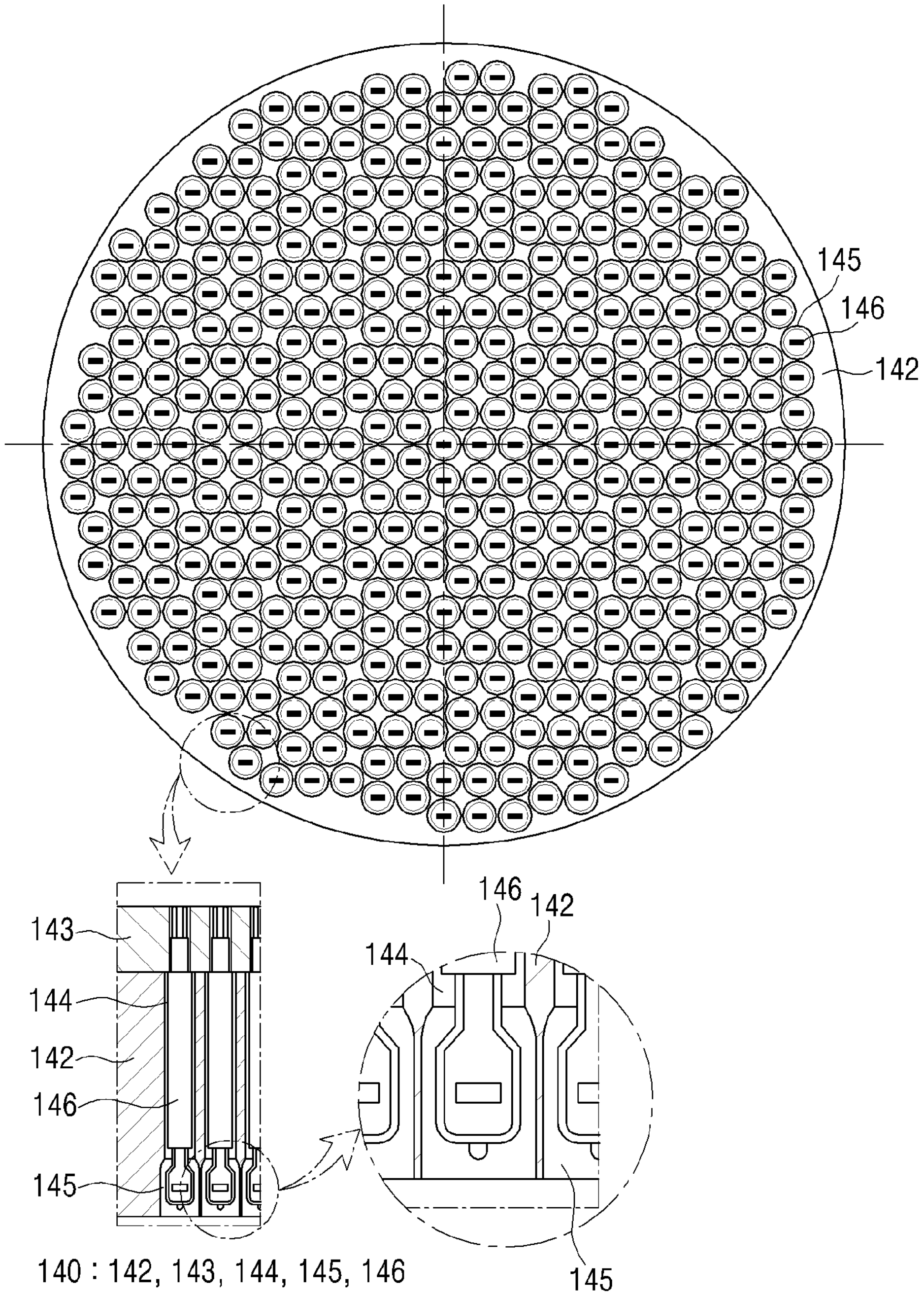
FIG. 6 is a bottom view of a heat source device in accordance with an embodiment of the present inventive concept.
Figure 7:
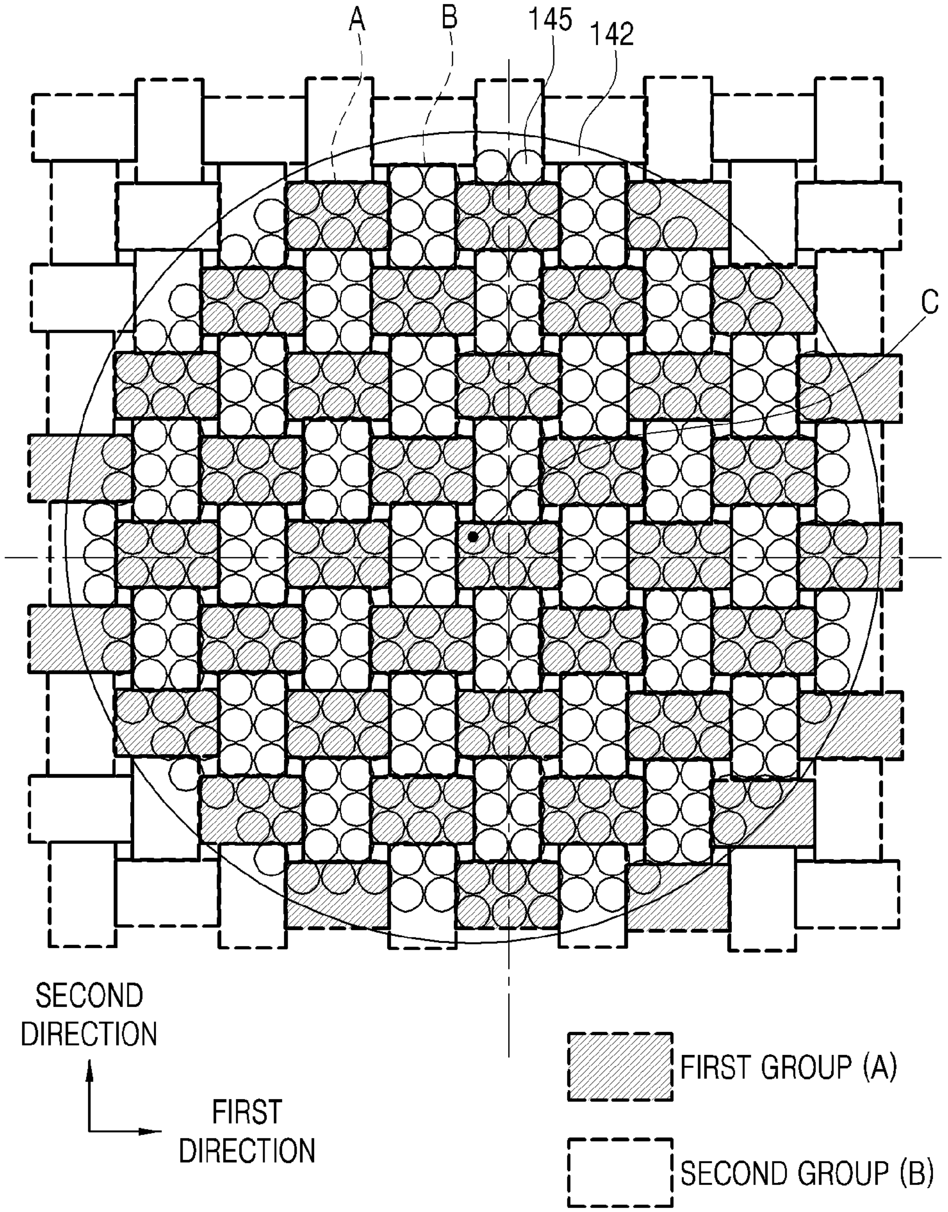
FIG. 7 shows an arrangement of grooves in a heat source device in accordance with an embodiment of the present inventive concept.
Figure 8:
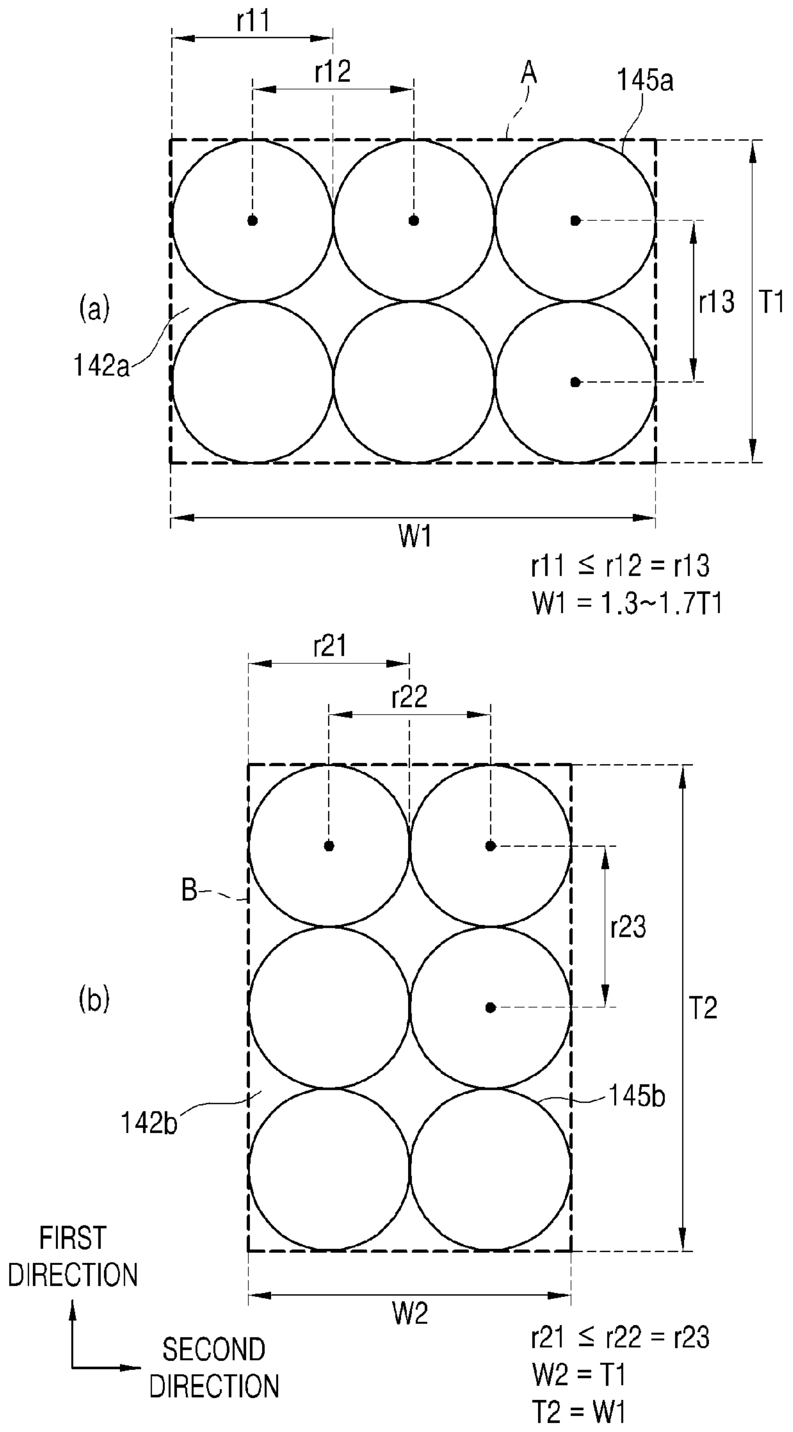
FIG. 8 is a schematic view for explaining the arrangement of the grooves as shown in FIG. 7.

FIG. 1 is a cross-sectional view of a substrate processing facility in accordance with an embodiment of the present inventive concept; FIG. 2 is a cross-sectional view showing in detail a part of a substrate support device in accordance with to an embodiment of the present inventive concept; FIG. 3 is a view illustrating a flow of a process gas on an upper portion of a substrate support member during substrate processing; FIG. 4 is a schematic diagram showing a substrate support device in accordance with an embodiment of the present inventive concept; FIG. 5 is a view showing a heat source applied to a heat source device in accordance with an embodiment of the present inventive concept; FIG. 6 is a bottom view of a heat source device in accordance with an embodiment of the present inventive concept; FIG. 7 shows an arrangement of grooves in a heat source device in accordance with an embodiment of the present inventive concept; and FIG. 8 is a schematic view for explaining the arrangement of the grooves as shown in FIG. 7.

Referring to FIG. 1, according to the present inventive concept, a substrate processing facility may comprise a chamber 110 having an inner space where a substrate S is treated, a substrate support device 120 installed in the chamber 110 and configured to support the substrate S, and a heat source device 140 installed in the chamber 110 and configured to heat the substrate S.

The chamber 110 may be provided with a processing space for treating the substrate S housed therein and may be formed as a hollow box shape or a block shape. The chamber 110 may comprise a chamber body 110*a* and a light penetrating window 110*b*, the light penetrating window 110*b* being coupled to the chamber body 110*a*.

Also, the chamber body 110*a* may be formed as a hollow shape with an open top, and the light penetrating window 110*b* may be coupled to the open top of the chamber body 110*a*. Although the chamber body 110*a* may be formed as a one-piece structure, it may be formed as an assembly with various pieces joined or coupled. For the assembly, a sealing means (not shown) may be further provided at junctions between each member. A sealing means (not shown) may be also provided at a junction between the chamber body 110*a* and the light penetrating window 110*b*. Thus, it is possible to reduce energy inputted in the chamber 110 when treating the substrate S.

The chamber body 110*a* may be provided with an opening and closing means 112 to introduce the substrate S into the chamber 110 or remove the substrate S from the chamber 110. Also, the chamber body 110*a* may be provided with a gas injection port 114 for supplying a process gas into the inner space of the chamber 110 and gas discharge port 116 for discharging the process gas supplied into the chamber 110 and other gases. To control a pressure within the chamber 110, a vacuum line 130 may be connected to the gas discharge port 116, so that the chamber 110 may be aspirated to discharge gases from the chamber 110 and a pressure within the chamber 110 may be controlled.

The vacuum line 130 may comprise an exhaust pipe 132 connected to the gas discharge port 116 and a pump 134 connected to the exhaust pipe 132. In addition, the chamber body 110*a* may be provided with a cooling line (not shown) to cool the chamber body 110*a*.

The substrate support device 120 may be provided within the chamber 110 to support the substrate S thereon. Also, the substrate support device 120 may rotate the substrate S, so that the substrate S may be uniformly treated during substrate processing.

The substrate support device 120 may comprise a rotating member 124 formed in a ring shape, a connecting member 126 formed in a ring shape and installed in an upper portion of the rotating member 124, and a substrate support member 128 formed in a ring shape and installed in an upper portion of the connecting member so as to extend outwardly of the connecting member, which is partially in contact with a lower surface of the substrate S.

The rotating member 124 may be rotatably installed on a bottom within the chamber 110. Also, a rotating member housing 122 may be installed in a lower portion of the rotating member 124 to set a position of the rotating member 124 and suppress detachment of the rotating member 124. The rotating member housing 122 may be installed within the chamber 110, for example on a bottom within the chamber 110 to support at least the lower portion and the inside of the rotating member 124.

The rotating member 124 may be formed in a ring shape. More particularly, the rotating member 124 may be formed as a hollow cylindrical form with open top and bottom. Also, the rotating member 124 may be formed as a one-piece structure, as well as it may be formed as an assembly in which at least two pieces are joined. For example, the rotating member 124 may comprise a rotating member body 124*a* and a friction prevention part 124*b* connected to a lower portion of the rotating member body 124*a*. The friction prevention part 124*b* may be formed at a junction with the rotation member housing 122 of the rotating member 124 to suppress friction between the rotating member 124 and the rotating member housing 122. The friction prevention part 124*b* may be made of a bearing etc., and the inside of the friction prevention part 124*b* may be in contact with the rotating member housing 122 and fixed thereto, and the outside may be free. The rotating member 124 may be connected to a driving means (not shown) which is installed in an interior or an exterior of the chamber 110 and rotated using power provided by the driving means.

The connecting member 126 may be installed in an upper portion of the rotating member 124. The connecting member 126 may be formed as a hollow cylindrical form extending in a vertical direction and having open top and bottom. The connecting member 126 may be formed to have an outer diameter less than or equal to an inner diameter of the rotating member 124 or the rotating member body 124*a*. Also, the connecting member 126 may be installed in a such way that a lower portion of the connecting member 126 is partially inserted into the rotating member 124 or the rotating member body 124*a*. In this case, a step may be formed on an inner wall of the rotating member 124, so that the connecting member 126 may be seated or supported on a top of the step. The rotating member 124 and the connecting member 126 may be connected to each other using a separate fixing member (not shown) since the connecting member 126 may be moved or detached in/from the upper portion of the rotating member 124 due to rotation of the rotating member 124 during substrate processing. However, the connecting member 126 may be installed in the rotating member 124 in various other ways.

The substrate support member 128 may be installed in an upper portion of the connecting member 126 to support the substrate S thereon. The substrate support member 128 may be made of a material having thermal properties identical or similar to those of the substrate S, and it may be formed to be partially contacted with a bottom of the substrate S to uniformly heat the substrate S during substrate processing. That is, to uniformly heat the substrate S, it is desirable to minimize contact areas between the substrate S and other structures. In other words, since a temperature deviation occurs between a region in contact with other structures and a region not in contact with other structures in the substrate S, to uniformly heat the substrate S, the contact areas between the substrate S and other structures should be minimized.

Also, the substrate support member 128 may comprise a main body 128*a* extending in a direction that intersects with the extending direction of the connecting member 126, a support unit 128*b* extending in a direction that intersects with the extending direction of the main body 128*a* and connected to the inside of the main body 128*a* to support the substrate S, and a seating unit 128*c* extending in a direction that intersects with the extending direction of the main body 128*a* and connected to a lower portion of the main body 128*a* to install in the connecting member 126.

The main body 128*a* may be formed in a ring shape and an upper surface of the main body 128*a* may be formed to be planar. In this case, the upper surface of the main body 128*a* may be formed to extend in the extending direction of the substrate S, for example a horizontal direction. Also, the upper surface may be formed to be horizontal or inclined downwardly from the inside of the main body 128*a* to the outside.

The support unit 128*b* may be formed in the inside of the main body 128*a* to extend in a direction that intersects with the extending direction of the main body 128*a*. Also, the support unit 128*b* may be formed to protrude upwardly from the upper surface of the main body 128*a*, so that the substrate S may be supported at a position higher than the upper surface of the main body 128*a*. The support unit 128*b* may be formed to be orthogonal to the upper surface of the main body 128*a*, or it may be formed to be inclined upwardly. In this case, an angle between the upper surface of the main body 128*a* and an outer surface of the support unit 128*b* may be more than 90° or less than 180°. The outer surface of the support unit 128*b* refers to a surface extending from the upper surface of the main body 128*a*. If said angle is less than 90°, then a process gas may be stagnant between the main body 128*a* and the support unit 128*b*. To the contrary, if said angle (θ) is more than 180°, then the substrate S may not be supported higher than the main body 128*a*. The support unit 128*b* may be formed in a lower surface of the substrate S in a line-contact or a dot-contact manner. In the former, a top portion of the support unit 128*b* that is in contact with the substrate S may be formed to have the same height along the circumference thereof. In the latter, a top portion of the support unit 128*b* that is in contact with the substrate S may be formed to have different heights along the circumference or have protrusions.

Referring to FIG. 3*a*, in a substrate support member 12 according to the prior art, a support unit 12*b* which supports a substrate S is disposed at a position lower than a main body 12*a*. Thus, a process gas supplied into a chamber did not move smoothly by the main body 12*a*, and a vortex or stagnation was generated in an upper portion of the support unit 12*b*. In this case, an edge region of the substrate S seated on the support unit 12*b* has a longer contact time with the process gas as compared with a central region of the substrate S, and consequently there is a problem that the substrate S is not uniformly and entirely treated. For example, when a thin film is formed on the substrate S, the thin film formed in the edge region of the substrate S has a thickness greater than that of the thin film formed in the central region of the substrate S.

To the contrary, as can be seen in FIG. 3*b*, when the support unit 128*b* which supports the substrate S is disposed at a position higher than the main body 128*a* and the upper surface of the main body 128*a* is formed to be planar, a process gas supplied into the chamber 110 can smoothly move between the surface of the substrate S and the main body 128*a* of the substrate support member 128. Also, the substrate support member 128 may be entirely disposed below the substrate S, that is, at a position lower than the substrate S. Thereby, it is possible to suppress a vortex or stagnation of the process gas between the main body 128*a* and the support unit 128*b*. As a result, the process gas may be uniformly contacted across the substrate S for a predetermined time, and the substrate S may be uniformly and entirely treated.

The substrate support member 128 may function to prevent a radiation emitted from the heat source device 140 from reaching the connecting member 126 and the rotating member 124 which are installed under the substrate support member 128, at the same time while supporting the substrate (S).

Referring to FIG. 4, the main body 128*a* may be formed in a ring shape wherein an inner diameter ($r_{EI}$) of the main body 128*a* may be smaller than the inner diameter ($r_{SI}$) and outer diameter ($r_{SO}$) of the connecting member 126, and an outer diameter ($r_{EO}$) of the main body 128*a* may be larger than the outer diameter ($r_{SO}$) of the connecting member 126. The outer diameter ($r_{EO}$) of the main body 128*a* may be larger than the outer diameter ($r_{SO}$) of the connecting member 126 and larger than or equal to the outer diameter ($r_{RO}$) of the rotating member 124 ($r_{SO}<r_{EO}$, $r_{RO}\leq r_{EO}$). Also, an outer diameter ($r_{ES}$) of the seating unit 128*c* may be larger than the inner diameter ($r_{EI}$) of the main body 128*a* and smaller than the outer diameter ($r_{EO}$) of the main body 128*a* ($r_{EI}<r_{ES}<r_{EO}$). By this configuration, the connecting member 126 and the rotating member 124 may be covered by a part of the main body 128*a*, so that it is possible to prevent a radiation emitted from the heat source device 140 from reaching the connecting member 126 and the rotating member 124 to overheat the connecting member 126 and the rotating member 124.

In addition, as can be seen in FIG. 3*b*, the substrate support member 128 may comprise a heat insulation layer 129 formed in at least a portion of the main body 128*a*, for example a bottom of the main body 128*a*.

The heat insulation layer 129 may be formed using a material that absorbs heat, a material having low thermal conductivity and the like. The heat insulation layer 129 may be formed from a material having good heat resistance and low reactivity with other materials at a high temperature such as alumina ($Al_2O_3$), yttria ($Y_2O_3$), zirconia ($ZrO_2$) and the like. The heat insulation layer 129 may suppress transfer of heat from the main body 128*a* heated by a radiation to a lower portion of the main body 128*a*.

Referring to FIGS. 1 and 2, the chamber 110 may be provided with a protective member 118 to protect the substrate support device 120 from a radiation during substrate processing. The heat source device 140 is installed in the chamber 110 to irradiate radiation across an area that is almost equal to an area of the substrate S or larger than an area of the substrate S. Therefore, the connecting member 126 and the rotating member 124 which are disposed on the outside of the substrate S in the substrate support device 120 may be directly exposed to the radiation. As such, to prevent the connection member 126 and the rotating member 124 from being exposed to the radiation, the protective member 118 may be installed on an inner surface of the chamber 110 to cover a portion of the substrate support device 120. At this time, since the substrate is rotated by the substrate support device 120 during substrate processing, the protective member 118 must be installed to be spaced apart from the substrate support member 128 and the connecting member 126. As a result, a space may be formed between the protective member 118 and the substrate support member 128, and between the protective member 118 and the connecting member 126. Therefore, when the heat source device 140 is operated to treat the substrate S, a radiation emitted from the heat source 146 of the heat source device 140 may be inputted between the protective member 118 and the substrate support member 128, and between the protective member 118 and the connecting member 126. To solve this problem, an outer diameter of the substrate support member 128, for example an outer diameter of the main body 128*a* may be formed to be larger than an inner diameter of the protective member 118 such that a portion of the main body 128*a* overlaps with the protection member 118 by a desired length L in a vertical direction. Thereby, it is possible to prevent the radiation emitted from the heat source 146 from being inputted between the substrate support member 128 and the protection member 118. In this case, at least a portion of an upper surface of the protective member 118 may be formed to be inclined downwardly to the substrate support member 128. By this configuration, it is possible to more effectively suppress or prevent the overheating of the connecting member 126 and the rotating member 124 which are installed under the substrate support member 128 by a radiation.

The heat source device 140 may be installed in the chamber 110 to heat the substrate S supported on the substrate support device 120. The heat source device 140 may comprise the support part 142 installed in an upper portion of the chamber 110 and a plurality of heat sources 146 installed in the support part 142 to heat the substrate S.

Referring to FIG. 5, the heat source 146 may be a bulb-type lamp which emits a radiation. The heat source 146 may comprise a light penetrating part **146*a* having an opening formed in at least a portion thereof and an inner space and a filament 146*b* installed in the inner space of the light penetrating part 146*a*. The opening of the light penetrating part 146*a* may be provided with a connecting member 146*c* including a terminal to fix the filament 146*b* and apply electrical power to the filament 146*b*. When applying electrical power to a lamp, a radiation is emitted from the filament 146*b*. The light penetrating part 146*a* is formed as a hollow cylindrical form. The light penetrating part 146*a* may have a circular cross-section in a transverse direction. The filament 146*b* may be formed in a '—' shape extending in a horizontal direction within the light penetrating part 146*a*. Therefore, when the heat source 146 is viewed from the front, as shown in FIG. 5*a*, it is seen that the filaments 146*b* are arranged in a '—' shape, and when the heat source 146 is viewed from the side, as shown in FIG. 5*b*, it is seen that the filaments 146*b*** are arranged in the form of 'dots (.)'.

Ideally, all the radiation emitted from the filament **146*b* is irradiated toward the substrate support device 120 which supports the substrate S. However, since the radiation is radially emitted, a reflector 146*d* may be formed in a portion of the light penetrating part 146*a* to collect the radiation emitted toward the opposite side of the substrate support device 120, for example the support part 142 and reflect it toward the substrate support device 120. The reflector 146*d* may be formed using a metal material having good reflectivity such as tungsten, molybdenum, nickel or gold, and may be coated on a surface of the light penetrating part 146*a* in the form of a thin film. Also, the reflector 146*d* may be formed using a non-metallic material such as ceramics having good heat resistance and low reactivity with other materials at a high temperature, so that the radiation emitted toward a top of the filament 146*b* is blocked and the connecting member 146*c* in the support part 142 or the heat source 146** is not overheated.

The support part 142 may be installed in an upper portion of the chamber 110 to heat the substrate S seated on the substrate support device 120 (see FIG. 1).

Referring to FIG. 6, the support part 142 may be provided with insertion holes 144 for inserting a plurality of heat sources 146. The insertion holes 144 may be formed through the support part 142 in one direction, for example a vertical direction. The support part 142 may be coupled to a socket 143 to supply electrical power to the plurality of heat sources 146. The support part 142 may be formed as a cylindrical form having a circular cross section and a desired thickness. However, the support part 142 may be formed in various shapes such as a polyhedron depending on the shape of the chamber 110 or the substrate S. Hereinafter, an embodiment in which the support part 142 is formed as a cylindrical form having a circular cross section will be described.

The support part 142 may have a surface coated with a fluorine-based polymer having good chemical resistance and heat resistance such as PTFE (polytetrafluoroethylene), PFA (perfluoro alkoxy), FEP (fluorinated ethylene propylene copolymer), ETFE (polyethlenetetrafluoroethylene), PCDF, PVDF (polyvinylidene fluoride), PVF (polyvinyl fluoride), PCTFE (polychlorotrifluoro ethylene). Also, a groove 145 may be formed in a lower portion of the insertion hole 144 to collect radiations emitted from the heat sources 146. The groove may be formed to be communicated with the insertion hole 144. The insertion holes 144 may be formed to be spaced apart from each other, and the groove 145 may be formed to be larger than a diameter of the insertion hole 144, so that the groove 145 may be partially in contact with an adjacent groove 145. Herein, the term "adjacent" means to be located next to, or closest to each other. A reflector (not shown) may be formed in the groove 145 to reflect the collected radiation toward the substrate support device 120, that is, the substrate S. The reflector may be formed using a metal material having high reflectivity and heat resistance such as tungsten (W), molybdenum (Mo), nickel (Ni) or gold (Au). Referring to FIG. 6, when viewed from a bottom of the support part 142, the groove is formed in a circular shape, but a wall surface of the groove 145 may be formed to be inclined or curved as an arc shape.

The grooves 145 may be formed in the support part 142 in a predetermined pattern. The grooves 145 may be disposed as a pattern which can increase the number of the heat source 146 installed in the support part 142 and uniformly and entirely heat the substrate S when treating the substrate S. Referring to FIG. 7, the grooves 145 may be divided into a first group A which has columns and rows and is disposed to extend in a first direction and a second group B which is disposed to extend in a second direction that intersects with the extending direction of the first group A. Hereinafter, the grooves 145 in the first group A are referred to as first grooves **145*a*, and the grooves 145 in the second group B are referred to as second grooves 145*b*. At this time, the first direction means a direction that intersects with the extending direction of the insertion hole 144, and the second direction means a direction that intersects with the extending direction of the insertion hole 144 and is orthogonal to the first direction. For example, the insertion hole 144** may be formed to extend in a vertical direction wherein the first direction may extend in a horizontal direction and the second direction may extend in a direction that is orthogonal to the first direction in the horizontal direction. Also, the first group A may be formed to extend in a transverse direction, and the second group B may be formed to extend in a longitudinal direction. As a result, the first group A and the second group B may be alternately disposed to form lines in different directions. That is, the first group A may be disposed to be spaced apart to form a line in the first direction, and the second group B may be disposed on at least one side of the first group A to form a line in the second direction. Herein, the line means an imaginary line formed by arranging the first group A or the second group B in one direction and does not mean a line which continuously extends. When arranging the first group A and the second group (B) in this way, the first group A and the second group B may exhibit a pattern such as a plain weave structure which is formed by crossing weft and warp yarns. That is, the alternately arranged weft and warp yarns are presents on a surface of fabric having a plain weave structure wherein each of the weft and warp yarns forms a line extending in one direction.

The heat source device according to an embodiment of the present inventive concept may have a first group A comprised of a plurality of first grooves **145*a* and a second group B comprised of a plurality of second grooves 145*b*** which are alternately disposed, whereby forming lines similar to lines formed by weft and warp yarns on a surface of fabric having a plain weave structure.

Referring to FIG. 8*a*, the first group A may comprise six first grooves 145*a* arranged to have three rows and two columns. These six first grooves 145*a* may be formed to have the same size, for example the same diameter r11. First, three first grooves 145*a* in the first row may be arranged such that the respective centers are positioned on a horizontal line, and the respective first grooves 145*a* are in contact with each other. Three first grooves 145*a* in the second row may be arranged such that the respective centers are positioned on a straight line, and the respective first grooves 145*a* are in contact with each other. The centers of the first grooves 145*a* in the first row and the first grooves 145*a* in the second row may be arranged to be positioned on a straight line. By this configuration, the distances r12 and r13 between the centers of the first grooves 145*a* adjacent to each other may be equal to the diameter r11 of the first grooves 145*a* (r11=r12=r13). Therefore, a length W1 of the first group A in a first direction may be 1.5 times (W1:T1=1.5:1) of a length T1 in a second direction, for example a direction that intersects with the first direction, whereby forming an approximately rectangular shape.

Referring to FIG. 8*b*, the second group B may comprise six second grooves 145*b* arranged to have two columns and three rows. These six second grooves 145*b* may be formed to have the same size, and they may be formed to have the same diameter as that of the first grooves 145*a*. First, two second grooves 145*b* in the first row may be arranged such that the respective centers are positioned on a horizontal line, and the respective second grooves 145*b* are in contact with each other. Two second grooves 145*b* in the second row may be arranged such that the respective centers are positioned on a straight line, and the respective second grooves 145*b* are in contact with each other. Two second grooves 145*b* in the third row may be arranged such that the respective centers are positioned on a straight line, and the respective second grooves 145*b* are in contact with each other. The centers of the second grooves 145*b* in the first row, the second grooves 145*b* in the second row and the second grooves 145*b* in the third row may be arranged to be positioned on a straight line.

In other words, the first group A includes a plurality of first grooves 145*a* arranged to have three columns and two rows, and the second group B includes a plurality of second grooves 145*b* arranged to have two columns and three rows. Also, the centers of each of the first grooves 145*a* and the second grooves 145*b* in each row is located on a horizontal line, and a distance between the centers of the first grooves 145*a* adjacent to each other, a distance between the centers of the second grooves 145*b* adjacent to each other and a distance between the centers of the first groove 145*a* and the second groove 145*b* adjacent to each other are the same. In addition, the first group A is disposed in the center of the support part 142, and the center of the first groove 145*a* disposed in one of 1 column 1 row, 1 column 2 row, 3 column 1 row and 3 column 2 row in the first group A is disposed in the center of the support part 142.

By this configuration, the distances r22 and r23 between the centers of the second grooves 145*b* adjacent to each other may be equal to the diameter r21 of the second grooves 145*a* (r21=r22=r23). Therefore, a length T2 of the second group B in a second direction may be 1.5 times (W2:T2=1.5:1) of a length W2 in a first direction, for example a direction that intersects with the second direction, whereby forming an approximately rectangular shape.

Additionally, the first group A and the second group B may have further expanded columns and rows of the first groove 145*a* and the second groove 145*b* as long as a plurality of grooves 145 may be arranged in a plain weave structure on the support part 142.

It has been described herein that the first grooves 145*a* in the first group A and the second grooves 145*b* in the second group B are formed to be in contact with each other. However, they may be formed to be spaced apart from each other. In this case, a distance between the centers of the first grooves 145*a* adjacent to each other, a distance between the centers of the second grooves 145*b* adjacent to each other and a distance between the centers of the first groove 145*a* and the second groove 145*b* adjacent to each other may be the same, and these distances may be larger than a diameter of the first groove 145*a* or the second groove 145*b* (r11<r12=r13, r21<r22=r23). Herein, the term "adjacent" means to be located next to, or closest to each other. As such, when the first grooves 145*a* and the second grooves 145*b* are formed to be spaced apart from each other, the first group A may be formed such that a ratio of a length W1 in a first direction and a length T1 in a second direction is about 1.3:1 to 1.7:1 or 1.4:1 to 1.6:1 depending on a distance between the grooves. Also, the second group B may be formed such that a ratio of a length W2 in the first direction and a length T2 in the second direction is about 1:1.3 to or 1:1.4 to 1.6. That is, the length W1 of the first group A in the first direction is the same as the length W2 of the second group B in the second direction, and the length T1 of the first group A in the second direction is the same as the length T2 of the second group B in the first direction. Also, an area of the first group A is the same as an area of the second group B.

As described above, the plurality of grooves 145 may be divided into the first group A and the second group B having a predetermined pattern, which may be alternately formed over the entire support part 142. At this time, the plurality of grooves 145 may be formed in the support part 142 such that the center of the first groove 145*a* located in one of 1 column 1 row, 1 column 2 row, 3 column 1 row and 3 column 2 row among the first grooves 145*a* in the first group A is placed in the center C of the support part 142. For example, the first groove 145*a* in 1 column 1 row of the first group A may be placed in the center of the support part 142, and the second group B and the first group A may be alternately disposed in the first direction that the first group A is extended. Also, the second group B and the first group A may be alternately disposed in the second direction, for example a direction that intersects with the first direction that the first group A is extended. At this time, the centers of the second grooves 145*b* disposed in the second row of the second group B may be placed between the first row and the second row of the first group A or in the middle of the length T1 of the first group A in the second direction. As a result, the first group A may be surrounded by four second groups B, and the second group B may be surrounded by four first groups A.

The foregoing heat source device 140 may have the centers of the grooves 145 almost continuously disposed in a radial direction of the support part 142 or in a radial direction of the substrate S. In this way, as the centers of the grooves 145 are continuously disposed in the radial direction of the support part 142, the entire substrate S may be uniformly exposed and heated to a radiation by rotating the substrate S during substrate processing.

In the above, it has been described that the substrate processing device comprises the substrate support device 120 comprising the substrate support member 128 installed in an upper portion of the connecting member 126 so as to extend outwardly of the connecting member 126, which is partially in contact with a lower surface of the substrate S, and the heat source device 140 comprising a plurality of first grooves 145*a* formed in the support part 142 to form the first group A extending in a first direction that intersects with the extending direction of the insertion hole 144 and a plurality of second grooves 145*b* formed in the support part 142 to form the second group B extending in a second direction that intersects with the extending direction of the insertion hole 144 and is orthogonal to the first direction. However, the substrate processing device may comprise the above-described substrate support device 120 and the heat source device formed in various patterns, or may comprise the above-described heat source apparatus and the substrate support device formed in various shapes. That is, one of the substrate support devices 120 and the heat source device 140 may be variously changed as long as the substrate processing device can uniformly heat the substrate while stably supporting the substrate S.

Hereinafter, to verify the performance of the heat source device in accordance with to an embodiment of the present inventive concept, the result of comparing the arrangement of grooves in the heat source device of the present inventive concept and the heat source device according to the prior art will be described.

Figure 9:
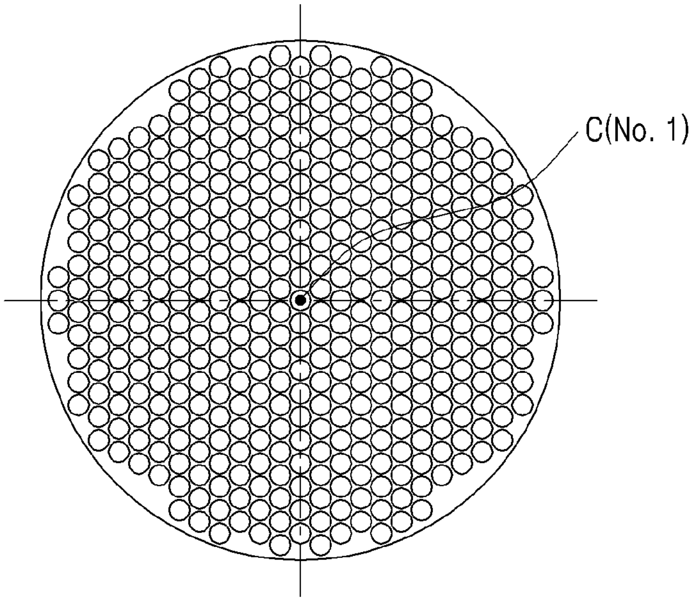
FIG. 9 is a graph illustrating a distance from the center of a heat source device to the center of each groove in a heat source device in accordance with the prior art.
Figure 9:
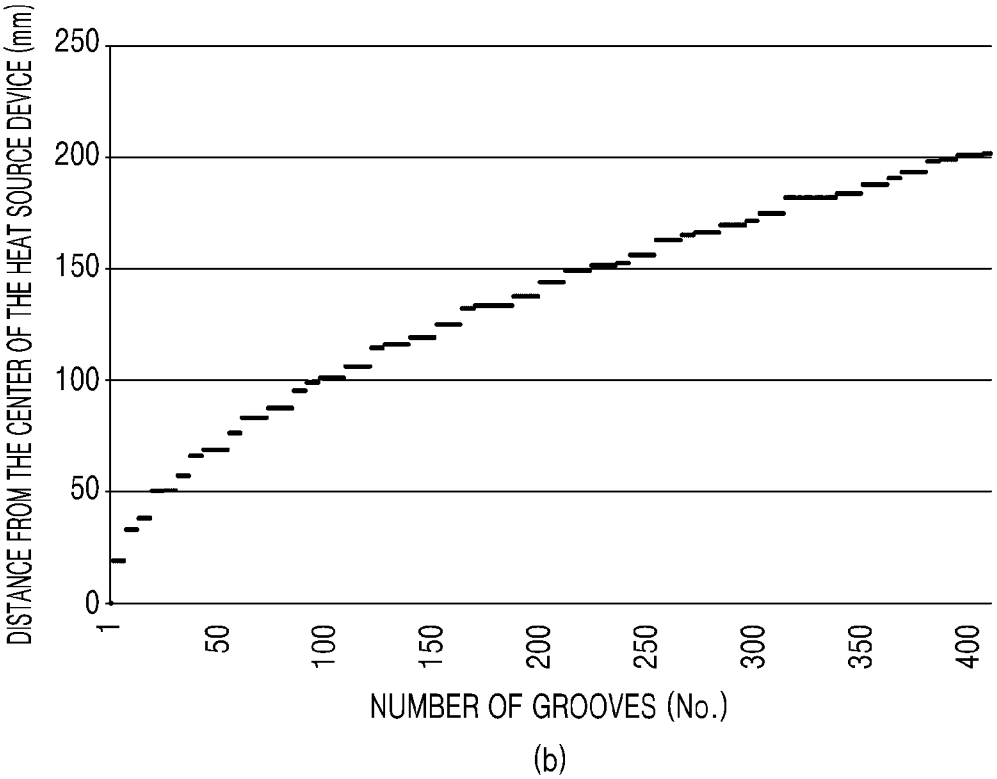
Figure 10:
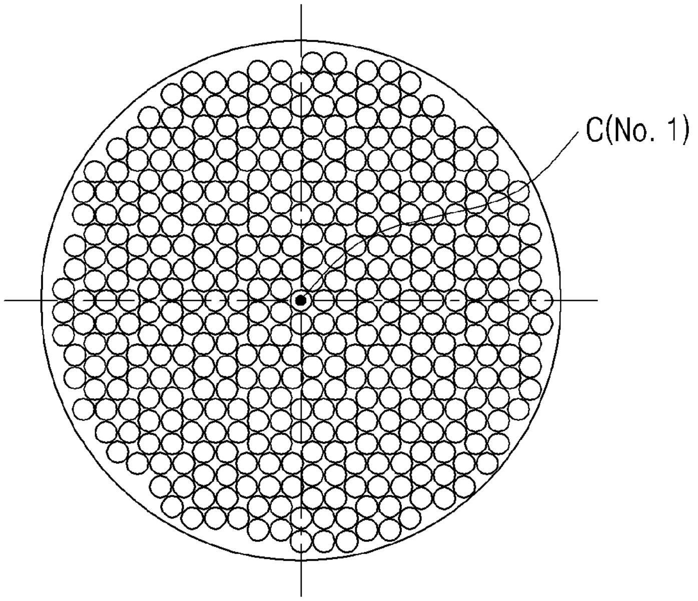
FIG. 10 is a graph illustrating a distance from the center of a heat source device to the center of each groove in a heat source device in accordance with an embodiment of the present inventive concept.
Figure 10:
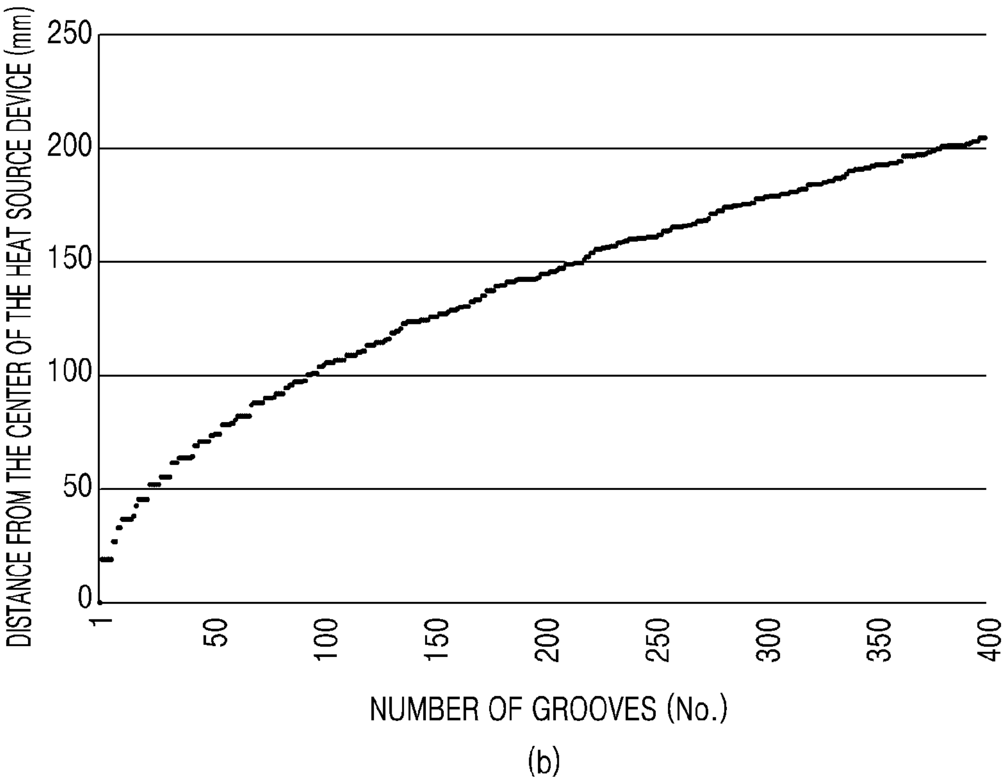

FIG. 9 is a graph illustrating a distance from the center of the heat source device to the center of each groove in the heat source device according to the prior art, and FIG. 10 is a graph illustrating a distance from the center of the heat source device to the center of each groove in the heat source device according to the present inventive concept. Herein, the center of the heat source device may mean the center of the support part, and the center of the support part may be the same as the center of the substrate seated on the substrate support device.

FIG. 9*a* is a view showing an example of a heat source device according to the prior art, wherein the heat source device includes a plurality of heat sources radially disposed with respect to the center C of the heat source device. The distances from the center of the heat source device to the centers of the grooves formed in the support part were respectively measured, and the measured distances were shown as shown in FIG. 9*b*. In FIG. 9*b*, the y-axis means the distance from the center of the support part in a radial direction of the support part, and the x-axis means the number of grooves formed in the support part. Herein, the groove formed in the center C of the support part is set to No. 1, and the number of the remaining grooves may be arbitrarily determined. For example, when 400 grooves are formed in the support part, each groove may be numbered from 1 to 400. At this time, among the grooves, there may be a plurality of grooves having the same distance from the center of the support part, but the number of grooves may be assigned to the grooves in the order away from the first groove formed in the center C of the support part. Alternatively, the number of grooves may be assigned to the groove while rotating spirally in a direction away from the first groove based on the first groove formed in the center C of the support part. However, the numbers can be assigned to grooves in various ways.

Referring to FIG. 9*b*, it can be seen that the centers of grooves are intermittently disposed along the radial direction of the support part from the center C of the heat source device 140. In particular, it can be seen that the centers of grooves are intermittently disposed in the range of about 150 mm from the center of the heat source device, for example the support part, so that a distance is formed between the center of one groove and the center of another groove. Also, it can be seen that the centers of grooves are hardly disposed in the range of about 175 to 180 mm from the center of the heat source device. In this case, if the substrate is treated while rotating the substrate, the substrate is not sufficiently exposed to radiation emitted from the heat source in the region that there is the distance between the centers of grooves in the radial direction of the heat source device. Thus, it is problematic that the substrate is not uniformly heated due to a difference in the amount or intensity of the radiation in the region where the centers of grooves are disposed and the region where the centers of the grooves are spaced apart.

FIG. 10*a* is a view showing the heat source device 140 according to the present inventive concept, wherein the heat source device includes a plurality of grooves 145 arranged to have a pattern of a plain weave structure on the support part 142. The distances from the center C of the heat source device 140 to the centers of the grooves 145 formed in the support part 142 were respectively measured, and the measured distances were shown as shown in FIG. 10*b*. In FIG. 10*b*, the y-axis means the distance from the center of the support part in a radial direction of the support part, and the x-axis means the number of grooves formed in the support part. The number of grooves may be determined in the same manner as described above.

Referring to FIG. 10*b*, it can be seen that the centers of grooves 145 are disposed almost continuously along a radial direction of the support part 142 from the center C of the heat source device 140. However, the centers of grooves 145 are intermittently disposed in the range of about 75 mm from the center of the heat source device 140, but since the distance between the center of one groove 145 and the center of another groove 145 is relatively short, and the grooves 145 have the respective area, the substrate can be sufficiently heated between the centers of grooves 145. In particular, since the substrate S is treated while rotating the substrate S, a radiation can reach uniformly along the radial direction of the substrate S, and the entire substrate S can be uniformly heated.

Although the present inventive concept has been described with reference to the accompanying drawings and the foregoing preferred embodiments, the present inventive concept is not limited thereto, and is defined only by the claims described below. Accordingly, it should be understood that various variations and modifications can be made to the present inventive concept without departing from the technical scope of the appended claims by those of ordinary skill in the art.

DESCRIPTION OF NUMERICAL REFERENCES

S: substrate
110: chamber
120: substrate support device
122: rotating member housing
124: rotating member
126: connecting member
128: substrate support member
128*a*: main body
128*b*: support unit
130: vacuum line
140: heat source device
142: support part
144: insertion hole
145: groove
145*a*: first groove
145*b*: second groove
146: heat source
A: first group
B: second group

The invention claimed is:

1. A heat source device for treating a substrate comprising a plurality of heat sources; and a support part provided with insertion holes formed to extend in one direction for inserting said heat sources, and grooves formed in one side of the insertion holes to collect and reflect radiations emitted from said heat sources, wherein the grooves comprise a plurality of first grooves formed in the support part to form a first group extending in a first direction that intersects with an extending direction of the insertion holes, and a plurality of second grooves formed in the support part to form a second group extending in a second direction that intersects with the extending direction of the insertion holes and is orthogonal to the first direction, wherein the first and second grooves are formed to have the same diameter, a length of the first group in the first direction is identical with a length of the second group in the second direction, and a length of the first group in the second direction is identical with a length of the second group in the first direction, and wherein the first group comprises a plurality of first grooves arranged in three columns and two rows, and the second group comprises a plurality of second grooves arranged in two columns and three rows.

2. The heat source device according to claim 1, wherein the first group and the second group are alternately disposed in the first direction and the second direction, and wherein the first group is disposed to be spaced apart to form lines in the first direction, and the second group is disposed in at least one side of the first group to form lines in the second direction.

3. The heat source device according to claim 1, wherein the first group is disposed to be surrounded by the second group, and the second group is disposed to be surrounded by the first group.

4. The heat source device according to claim 1, wherein a distance between the centers of the first grooves adjacent to each other, a distance between the centers of the second grooves adjacent to each other, and a distance between the centers of the first groove and the second groove adjacent to each other may be the same.

5. The heat source device according to claim 4, wherein the first group is disposed in the middle of the support part, and the center of the first groove disposed in one of 1st column 1st row, 1st column 2nd row, 3rd column 1st row and 3rd column 2nd row in the first group is disposed in the center of the support part.

6. A substrate processing facility comprising a chamber having an inner space where a substrate is treated;

a substrate support device installed in the chamber to support the substrate; and a heat source device installed in the chamber to heat the substrate, as defined in claim 1.

7. The substrate processing facility according to claim 6, wherein the substrate support device comprises:

a rotating member formed in a ring shape;

a connecting member formed in a ring shape and installed in an upper portion of the rotating member; and a substrate support member formed in a ring shape and installed in an upper portion of the connecting member so as to extend outwardly of the connecting member, which is partially in contact with a lower surface of a substrate.

8. The substrate processing facility according to claim 7, wherein the substrate support member is formed to be entirely disposed at a position below the lower surface of the substrate.

9. The substrate processing facility according to claim 7, wherein the substrate support member comprises, a main body extending in a direction that intersects with the extending direction of the substrate;

a support unit being able to contact with a substrate and connected to an upper portion of the main body to extend in a direction that intersects with the extending direction of the main body; and a seating unit being able to contact with the connecting member and connected to a lower portion of the main body to extend in a direction that intersects with the extending direction of the main body, wherein the main body and the seating unit are formed in a ring shape, and wherein an outer diameter of the main body is greater than an outer diameter of the connecting member, and an outer diameter of the seating unit is smaller than the outer diameter of the main body.

10. The substrate processing facility according to claim 9, wherein an upper surface of the main body is formed to be planar.

11. The substrate processing facility according to claim 10, wherein the upper surface of the main body is formed to be inclined downwardly to the outside.

12. The substrate processing facility according to claim 10, wherein an angle between the support unit and the main body is greater than or equal to 90° and less than 180°.

13. The substrate processing facility to claim 9, wherein the substrate support member comprises a heat insulation layer which is formed on at least the lower surface of the main body.

14. The substrate processing facility according to claim 7, further comprising a protective member installed in the chamber to surround at least a portion of the substrate support device, wherein the protective member is disposed to be spaced apart from the connecting member in a horizontal direction and to overlap a portion of the substrate support member in a vertical direction.

15. The substrate processing facility according to claim 7, wherein the substrate support member is entirely disposed at a position lower than the substrate and is formed to cover at least the connecting member.

* * * * *